(12) United States Patent
Chang et al.

(10) Patent No.: US 10,976,857 B1
(45) Date of Patent: Apr. 13, 2021

(54) METHOD AND APPARATUS FOR DRIVING TOUCH DISPLAY DRIVER INTEGRATED CIRCUIT OF TOUCH-SENSITIVE DISPLAY PANEL

(71) Applicant: HIMAX TECHNOLOGIES LIMITED, Tainan (TW)

(72) Inventors: Yaw-Guang Chang, Tainan (TW); Hui-Min Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/819,156

(22) Filed: Mar. 15, 2020

(51) Int. Cl.
 *G06F 3/041* (2006.01)
 *G02F 1/1333* (2006.01)

(52) U.S. Cl.
 CPC .......... *G06F 3/0416* (2013.01); *G06F 3/0412* (2013.01); *G02F 1/13338* (2013.01)

(58) Field of Classification Search
 CPC ..... G09G 3/3666; G06F 3/044; G06F 3/0416; G06F 3/0412; G02F 1/13338
 See application file for complete search history.

(56) References Cited

U.S. PATENT DOCUMENTS

| 2013/0278557 A1* | 10/2013 | Hotelling | G06F 3/04164 345/174 |
| 2016/0041675 A1* | 2/2016 | Yang | G06F 3/0443 345/174 |
| 2017/0269737 A1* | 9/2017 | Zou | H05K 1/028 |
| 2017/0351378 A1* | 12/2017 | Wang | G06F 3/044 |
| 2019/0129532 A1* | 5/2019 | Zhao | G06F 3/0443 |

* cited by examiner

*Primary Examiner* — Abbas I Abdulselam
(74) *Attorney, Agent, or Firm* — Winston Hsu

(57) ABSTRACT

A method and apparatus for driving a touch display driver integrated circuit (TDDI) of a touch-sensitive display panel are provided. The method may include: in a display phase of the touch-sensitive display panel, utilizing a reference voltage generator to generate a reference voltage having a predetermined voltage level to be a common voltage of the touch-sensitive display panel, and utilizing a common voltage operational amplifier (OPAMP) to drive the common voltage to the TDDI IC through a common voltage path, for performing display control of the touch-sensitive display panel; and in a touch-sensing phase of the touch-sensitive display panel, utilizing a touch-sensing waveform generator to generate a touch-sensing waveform signal carrying at least one touch-sensing waveform, and utilizing the common voltage OPAMP to drive the touch-sensing waveform signal to the TDDI IC through the common voltage path, for performing touch-sensing control of the touch-sensitive display panel.

6 Claims, 5 Drawing Sheets

METHOD AND APPARATUS FOR DRIVING TOUCH DISPLAY DRIVER INTEGRATED CIRCUIT OF TOUCH-SENSITIVE DISPLAY PANEL

BACKGROUND OF THE INVENTION

1. Field of the Invention

The present invention relates to touch screens, and more particularly, to a method and apparatus for driving a touch and display driver integration (TDDI) integrated circuit (IC) of a touch-sensitive display panel.

2. Description of the Prior Art

FIG. 1 illustrates an example of touch and display control of a liquid crystal display (LCD) touch screen, and FIG. 2 illustrates some signals regarding the touch and display control. In a display phase, the LCD touch screen may set voltage levels of common voltage (VCOM) electrodes on VCOM plates of a LCD panel thereof to be a reference voltage VREF for display (e.g. VCOM=−2 Volts (V)). In a touch-sensing phase, the LCD touch screen may send sensing waveforms to the VCOM electrodes for touch-sensing. As there are signals from sensing operational amplifiers (OPAMPs) and signals from VCOM-OPAMPs in TDDI ICs of the LCD touch screen, implementing complicated circuits (e.g. a series of complicated multiplexers (MUXs) respectively coupled to a series of analog-to-digital converters (ADCs)) in the TDDI ICs is typically required. In addition, as implementing a sensing waveform generator, the sensing OPAMPs and the VCOM-OPAMPs, and corresponding electrical connections for the above control is required, respective pin count of associated ICs of the LCD touch screen may be too great, and high power consumption of these OPAMPs may degrade the overall performance of the LCD touch screen. Hence, there is a need for a novel method and associated architecture to enhance the overall performance of an electronic device without introducing a side effect or in a way that is less likely to introduce a side effect.

SUMMARY OF THE INVENTION

It is therefore an objective of the present invention to provide a method and apparatus for driving a touch and display driver integration (TDDI) integrated circuit (IC) of a touch-sensitive display panel, in order to solve the above-mentioned problems.

At least one embodiment of the present invention provides a method for driving a TDDI IC of a touch-sensitive display panel, where the method may comprise: in a display phase of the touch-sensitive display panel, utilizing a reference voltage generator to generate a reference voltage having a predetermined voltage level to be a common voltage of the touch-sensitive display panel, and utilizing a common voltage operational amplifier (OPAMP) to drive the common voltage to the TDDI IC through a common voltage path, for performing display control of the touch-sensitive display panel; and in a touch-sensing phase of the touch-sensitive display panel, utilizing a touch-sensing waveform generator to generate a touch-sensing waveform signal carrying at least one touch-sensing waveform, and utilizing the common voltage OPAMP to drive the touch-sensing waveform signal to the TDDI IC through the common voltage path, for performing touch-sensing control of the touch-sensitive display panel.

At least one embodiment of the present invention provides an apparatus for driving a TDDI IC of a touch-sensitive display panel, where the apparatus may comprise a hybrid control circuit that is coupled to the touch-sensitive display panel through the TDDI IC, and the hybrid control circuit may be arranged to control the TDDI IC to control the touch-sensitive display panel. In addition, the hybrid control circuit may comprise a reference voltage generator, a touch-sensing waveform generator, a multiplexer that is coupled to the reference voltage generator and the touch-sensing waveform generator, and a common voltage OPAMP coupled to the multiplexer. More particularly, the reference voltage generator may be arranged to generate a reference voltage having a predetermined voltage level to be a common voltage of the touch-sensitive display panel, the touch-sensing waveform generator may be arranged to generate a touch-sensing waveform signal carrying at least one touch-sensing waveform, the multiplexer may be arranged to select and output any of the common voltage and the touch-sensing waveform signal, and the common voltage OPAMP may be arranged to drive said any of the common voltage and the touch-sensing waveform signal to the TDDI IC through a common voltage path. For example, in a display phase of the touch-sensitive display panel, the common voltage OPAMP may drive the common voltage to the TDDI IC through the common voltage path, for performing display control of the touch-sensitive display panel. In a touch-sensing phase of the touch-sensitive display panel, the common voltage OPAMP may drive the touch-sensing waveform signal to the TDDI IC through the common voltage path, for performing touch-sensing control of the touch-sensitive display panel.

According to some embodiments, the apparatus may comprise a timing controller of the touch-sensitive display panel, and the hybrid control circuit may be integrated into the timing controller.

According to some embodiments, the apparatus may comprise a touch screen, where the touch screen may comprise: the touch-sensitive display panel; the TDDI IC that is mounted on the touch-sensitive display panel and coupled to the touch-sensitive display panel; and at least one portion (e.g. a portion or all) of the common voltage path, coupled between the common voltage OPAMP and the TDDI IC.

The present invention method and associated apparatus (e.g. the hybrid control circuit, the timing controller, the touch screen, etc.) can guarantee that the touch-sensitive display panel can operate properly in various situations, respectively. In addition, the present invention method and associated apparatus can save respective pin counts of associated ICs of the touch-sensitive display panel, and can save the OPAMP count and the associated chip area and power consumption. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
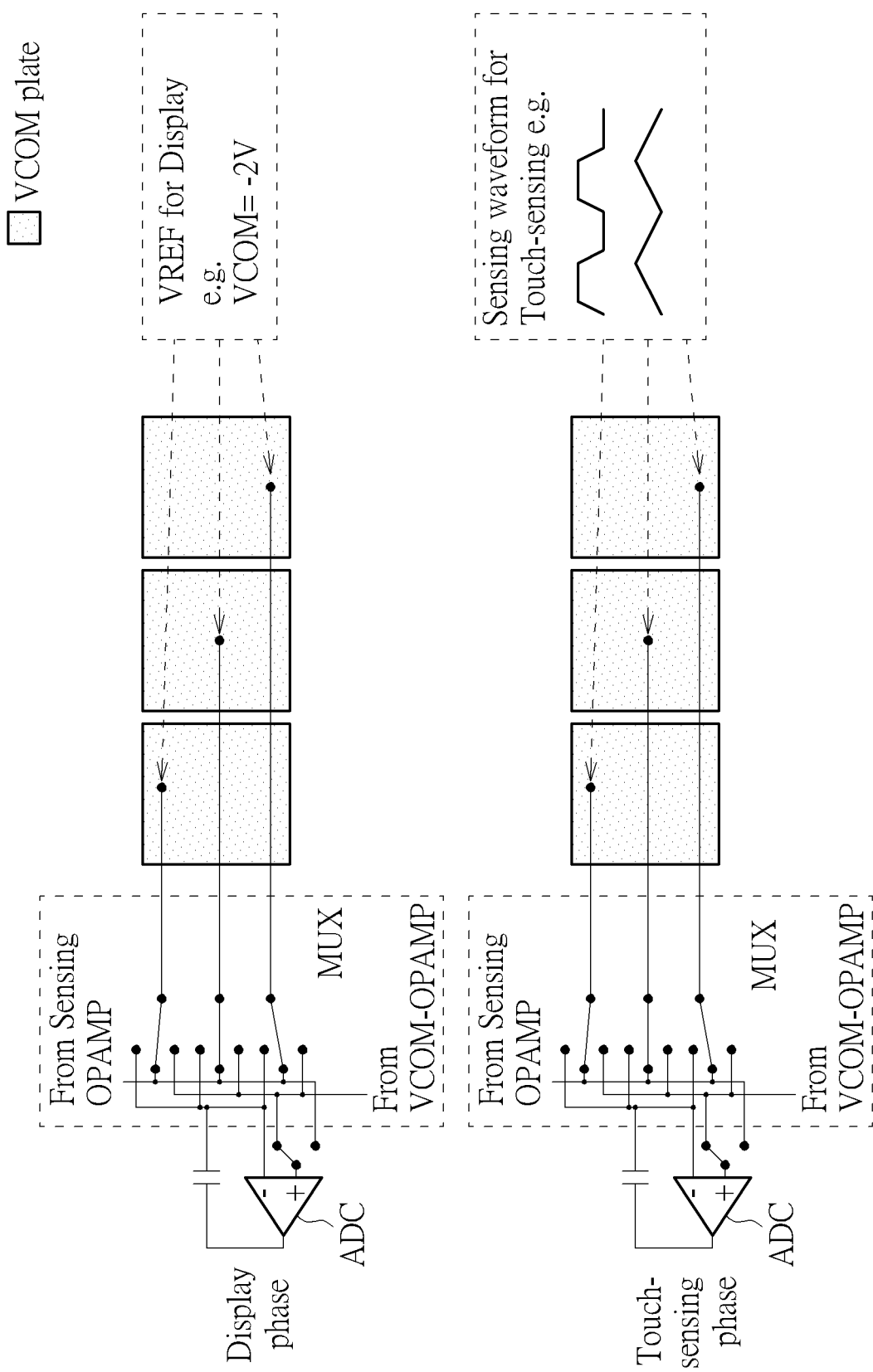
FIG. 1 illustrates an example of touch and display control of a liquid crystal display (LCD) touch screen.
Figure 2:
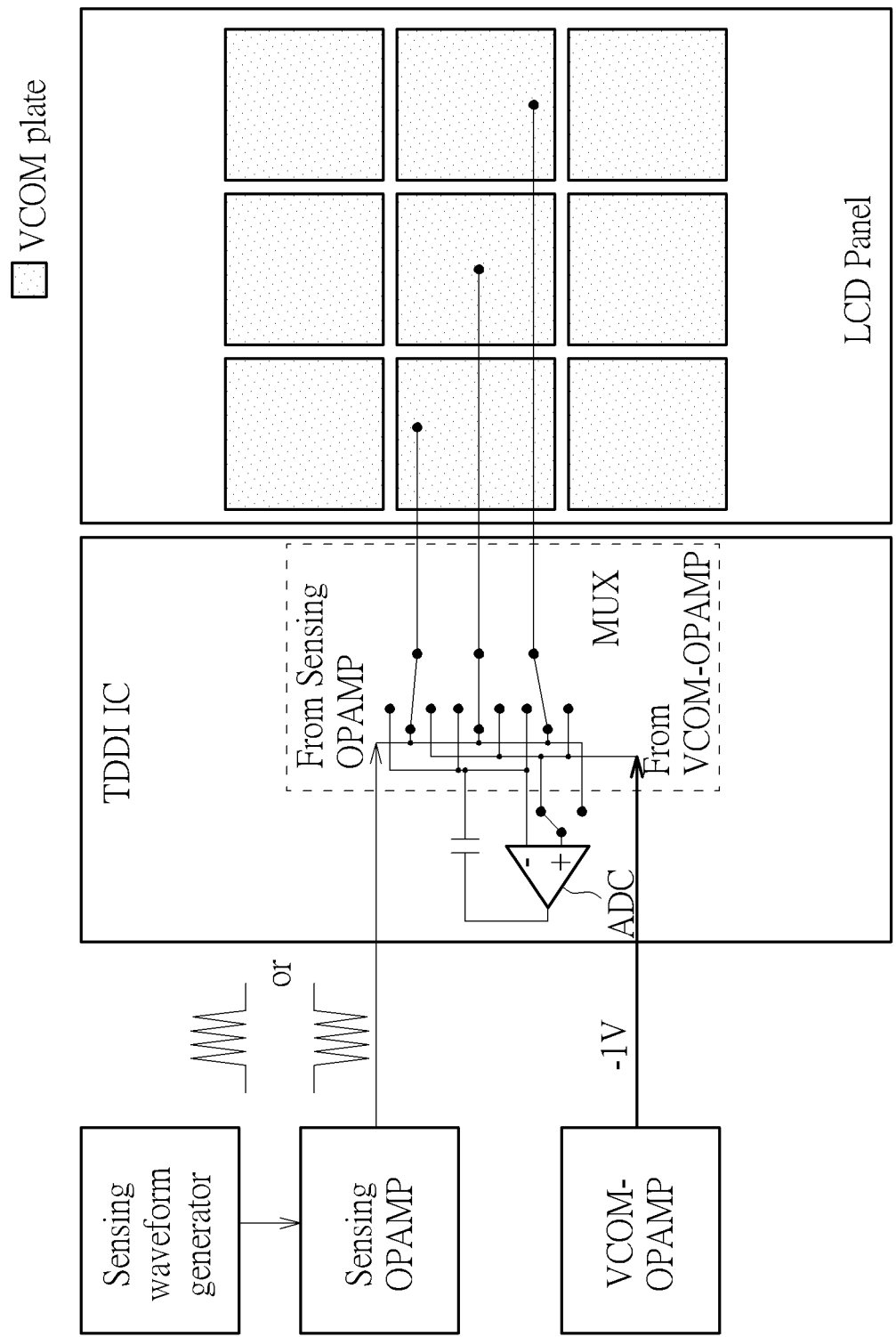
FIG. 2 illustrates some signals regarding the touch and display control.
Figure 3:
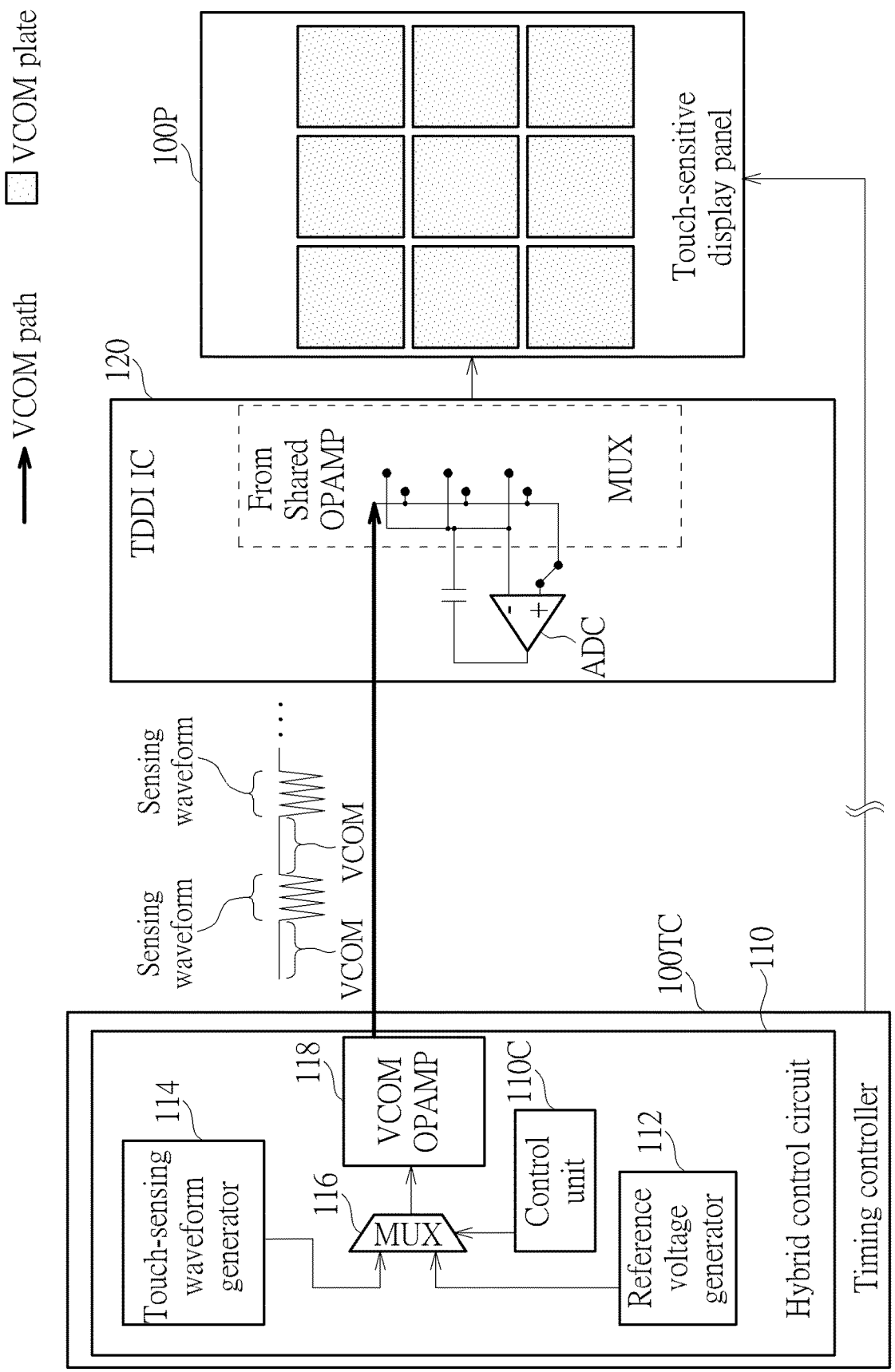
FIG. 3 is a diagram of an apparatus for driving a touch and display driver integration (TDDI) integrated circuit (IC) of a touch-sensitive display panel according to an embodiment of the present invention, where the whole of a touch screen may be illustrated for better comprehension.

FIG. 3 is a diagram of an apparatus for driving a touch and display driver integration (TDDI) integrated circuit (IC) of a touch-sensitive display panel 100P according to an embodiment of the present invention, where the whole of a touch screen 100 (e.g. an LCD touch screen) may be illustrated for better comprehension. The touch screen 100 may comprise a touch-sensitive display panel 100P (e.g. an LCD panel having a touch panel embedded therein), a timing controller 100TC, and at least one TDDI IC (e.g. one or more TDDI ICs), which may be collectively referred to as the TDDI IC 120. For example, the TDDI IC 120 may be mounted on the touch-sensitive display panel 100P and coupled to the touch-sensitive display panel 100P. In addition, the timing controller 100TC may comprise a hybrid control circuit 110 that is coupled to the touch-sensitive display panel 100P through the TDDI IC 120, and the hybrid control circuit 110 may control the TDDI IC 120 to control the touch-sensitive display panel 10P, for controlling some operations regarding display control and touch-sensing control of the touch-sensitive display panel 100P, where the hybrid control circuit 110 of this embodiment may be integrated into the timing controller 110TC, but the present invention is not limited thereto.

As shown in FIG. 3, the hybrid control circuit 110 may comprise a control unit 110C (e.g. microcontroller, microprocessor, etc.), a reference voltage generator 112, a touch-sensing waveform generator 114, a multiplexer (MUX) 116 that is coupled to the reference voltage generator 112 and the touch-sensing waveform generator 114, and a common voltage (VCOM) operational amplifier (OPAMP) 118 coupled to the multiplexer 116. The common voltage OPAMP 118 may be implemented by way of unit gain buffer, etc., but the present invention is not limited thereto. In addition, the control unit 110C may control operations of the hybrid control circuit 110. More particularly, the reference voltage generator 112 may generate a reference voltage having a predetermined voltage level (e.g. a voltage level falling within an interval [−3, 0] (V)) to be a common voltage (VCOM) of the touch-sensitive display panel 100P, and the touch-sensing waveform generator 114 may generate a touch-sensing waveform signal carrying at least one touch-sensing waveform (e.g. one or more touch-sensing waveforms, which may be referred to as sensing waveforms for brevity). Under control of a selection signal generated by the control unit 110C, the multiplexer 116 may select and output any of the common voltage and the touch-sensing waveform signal, and the common voltage OPAMP 118 may drive said any of the common voltage and the touch-sensing waveform signal to the TDDI IC 120 through a common voltage path (e.g. the arrow from the VCOM OPAMP to the MUX of the TDDI IC 120), where two states (e.g. two logical values) of the selection signal may correspond to the display phase and the touch-sensing phase, respectively.

For better comprehension, a hybrid signal having multiple partial signals (respectively labeled "VCOM" and "Sensing waveform") may be illustrated on the common voltage path to indicate that the common voltage path may be arranged to transmit the common voltage and the touch-sensing waveform signal, but the present invention is not limited thereto. Based on the architecture shown in FIG. 3, the common voltage OPAMP 118 may be shared by the reference voltage generator 112 and the touch-sensing waveform generator 114, and therefore, may be regarded as a shared OPAMP. For example, in a display phase of the touch-sensitive display panel 100P, the common voltage OPAMP 118 may drive the common voltage (e.g. VCOM) to the TDDI IC 120 through the common voltage path, for performing the display control of the touch-sensitive display panel 100P. In a touch-sensing phase of the touch-sensitive display panel 100P, the common voltage OPAMP 118 may drive the touch-sensing waveform signal (e.g. the sensing waveforms) to the TDDI IC 120 through the common voltage path, for performing the touch-sensing control of the touch-sensitive display panel 100P.

According to some embodiments, the apparatus may comprise at least one portion (e.g. a portion or all) of the touch screen 100. For example, the apparatus may comprise a portion of the touch screen 100, such as the hybrid control circuit 110, the timing controller 100TC, etc. For another example, the apparatus may comprise the whole of the touch screen 100.

According to some embodiments, the common voltage path may comprise a wire positioned in a flexible printed circuit (FPC), such as a VCOM wire in the FPC, where the FPC may be coupled between the common voltage OPAMP 118 and the TDDI IC 120, but the present invention is not limited thereto. According to some embodiments, the common voltage path may comprise a wire positioned in a flexible circuit of a chip-on-flex (COF) architecture. More particularly, at least one side (e.g. one or more sides) of two sides of the common voltage path may be implemented with a chip of the COF architecture. For example, one or more of the hybrid control circuit 110 and the TDDI IC 120 may be implemented with one or more chips of the COF architecture. For another example, one or more of the timing controller 100TC and the TDDI IC 120 may be implemented with one or more chips of the COF architecture. For brevity, similar descriptions for these embodiments are not repeated in detail here.

Figure 4:
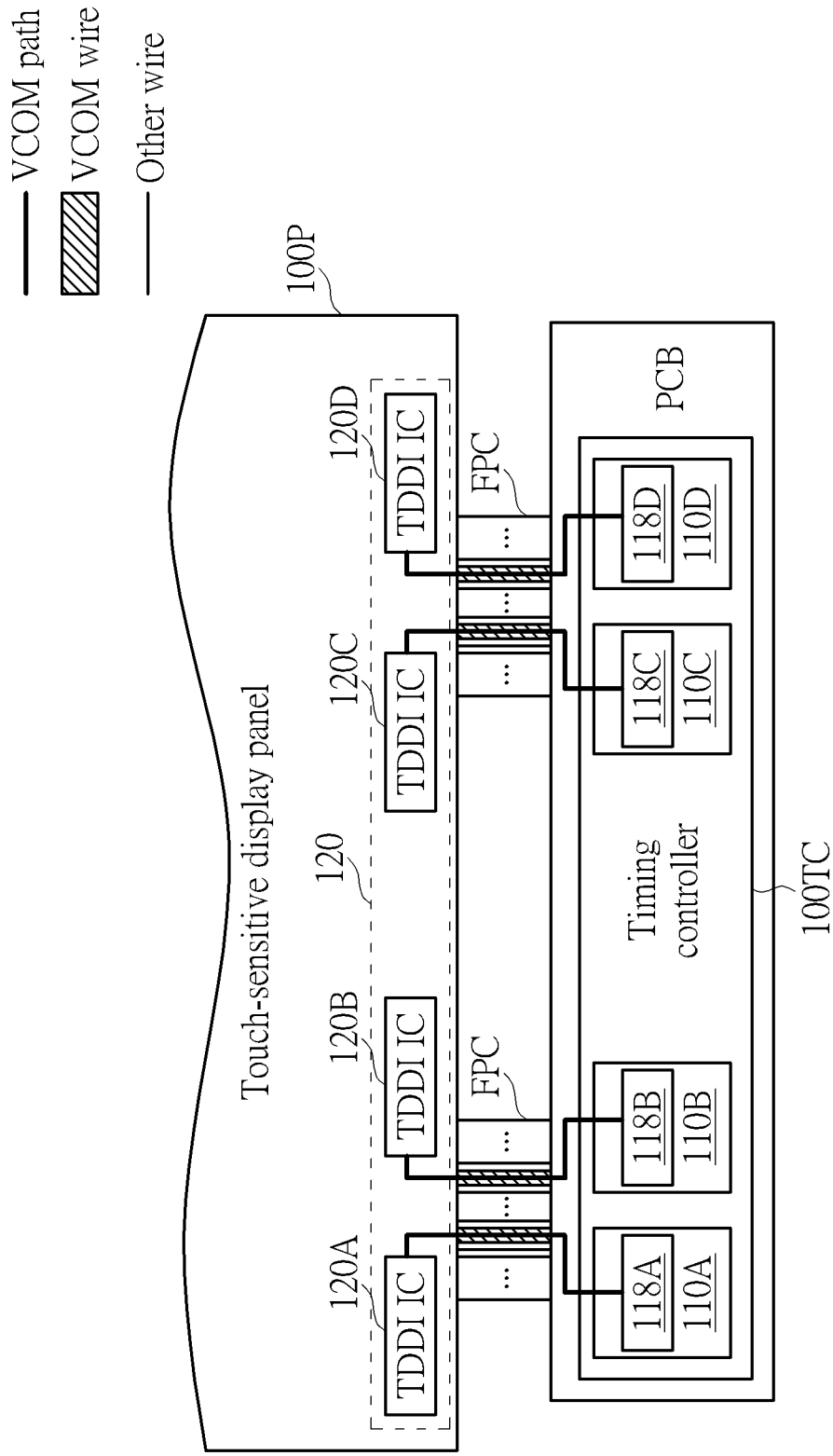
FIG. 4 illustrates some TDDI ICs, associated flexible printed circuits (FPCs), etc. of the touch screen shown in FIG. 3 according to an embodiment of the present invention.

FIG. 4 illustrates some TDDI ICs {120A, 120B, 120C, 120D}, associated FPCs, etc. of the touch screen 100 shown in FIG. 3 according to an embodiment of the present invention. For example, the TDDI IC 120 may comprise the TDDI ICs {120A, 120B, 120C, 120D}, and the timing controller 100TC may comprise multiple hybrid control circuits {110A, 110B, 110C, 110D} respectively corresponding to the TDDI ICs {120A, 120B, 120C, 120D}. The hybrid control circuits {110A, 110B, 110C, 110D} may having the same architecture (e.g. internal components, associated connections, etc.) as that of the hybrid control circuit 110 shown in FIG. 3, and more particularly, may comprise multiple shared OPAMPs such as multiple common voltage OPAMPs {118A, 118B, 118C, 118D} for driving the TDDI ICs {120A, 120B, 120C, 120D} through VCOM paths, respectively. The hybrid control circuits {110A, 110B, 110C, 110D} (e.g. the internal components thereof such as the common voltage OPAMPs {118A, 118B, 118C, 118D}, etc.), the TDDI ICs {120A, 120B, 120C, 120D}, and the VCOM paths coupled between them as shown in FIG. 4 may be taken as examples of the hybrid control circuit 110 (e.g. the internal components thereof such as the common voltage OPAMP 118, etc.), the TDDI IC 120, and the VCOM path shown in FIG. 3, respectively.

In addition, the timing controller 100TC of this embodiment may be mounted on a printed circuit board (PCB). In a latest circuit design of the touch screen 100, four FPCs of a previous version of the touch screen 100 may have been canceled (e.g. the canceled FPCs have been removed from this architecture), and may be replaced by two FPCs respectively having the VCOM wires, the other wires, etc., where the VCOM wires may be taken as examples of the aforementioned VCOM wire in the FPC. As the common voltage OPAMPs {118A, 118B, 118C, 118D} are shared OPAMPs for both the display control and the touch-sensing control of the touch-sensitive display panel 100P, the apparatus can save respective pin counts of associated ICs of the touch-sensitive display panel 100P, and can save the OPAMP count and the associated chip area and power consumption, where the four FPCs can be replaced with the two FPCs with ease. For brevity, similar descriptions for this embodiment are not repeated in detail here.

Figure 5:
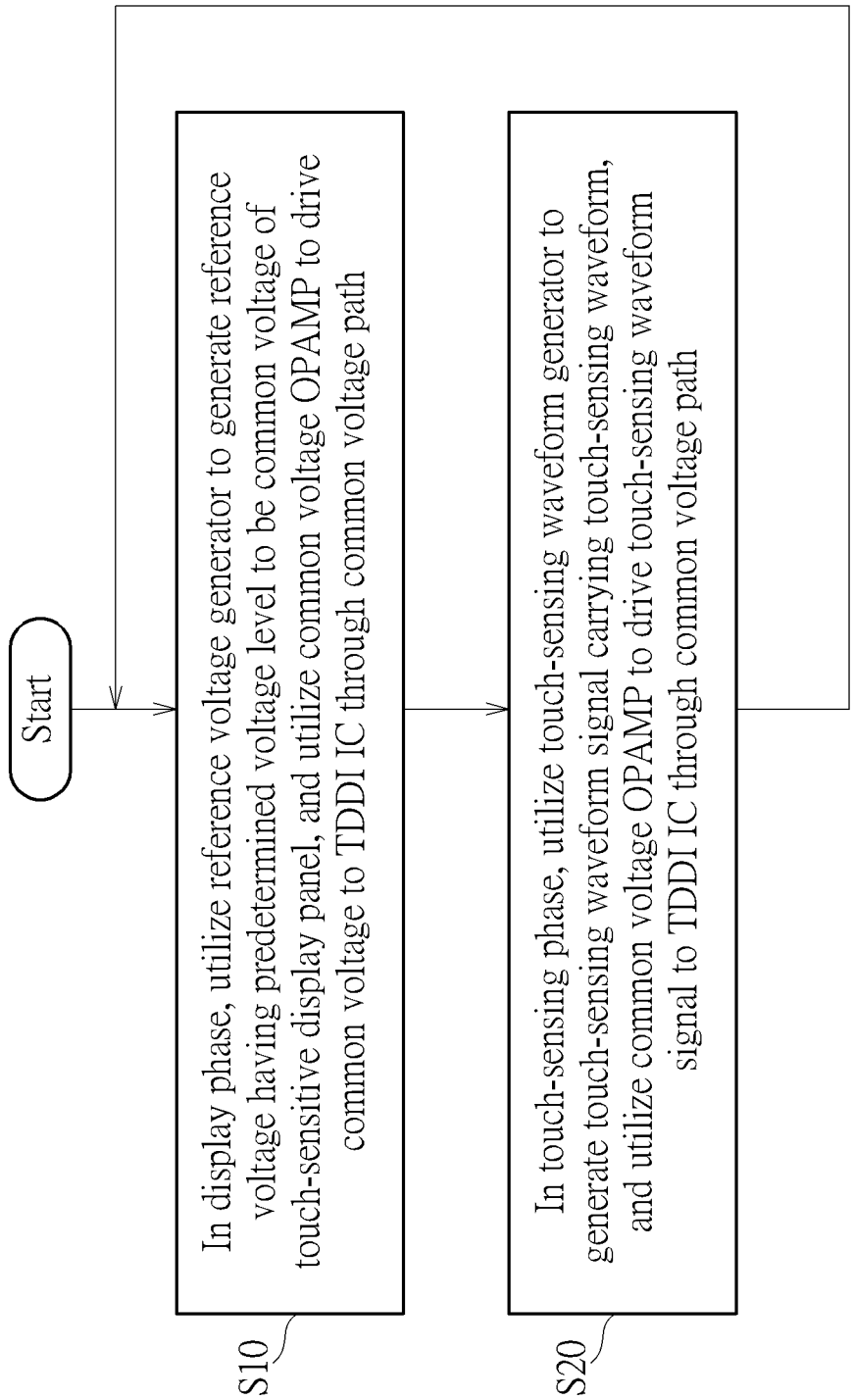
FIG. 5 is a flowchart of a method for driving a TDDI IC of a touch-sensitive display panel according to an embodiment of the present invention.

FIG. 5 is a flowchart of a method for driving a TDDI IC of a touch-sensitive display panel (e.g. the touch-sensitive display panel 100P) according to an embodiment of the present invention. The method may be applied to the associated apparatus (e.g. the hybrid control circuit 110, the timing controller 100TC, the touch screen 100, etc.), and may be executed by the apparatus.

In Step S10, in the display phase of the touch-sensitive display panel 100P, the apparatus may utilize the reference voltage generator 112 to generate the reference voltage having the predetermined voltage level to be the common voltage (VCOM) of the touch-sensitive display panel 100P, and utilize the common voltage OPAMP 118 to drive the common voltage to the TDDI IC 120 through the common voltage path, for performing the display control of the touch-sensitive display panel 100P.

In Step S20, in the touch-sensing phase of the touch-sensitive display panel 100P, the apparatus may utilize the touch-sensing waveform generator 114 to generate the touch-sensing waveform signal carrying the aforementioned at least one touch-sensing waveform, and utilize the common voltage OPAMP 118 to drive the touch-sensing waveform signal to the TDDI IC 120 through the common voltage path, for performing the touch-sensing control of the touch-sensitive display panel 100P.

For example, the working flow shown in FIG. 5 may be repeated for further operational periods of the touch-sensitive display panel 100P, but the present invention is not limited thereto. For brevity, similar descriptions for this embodiment are not repeated in detail here.

For better comprehension, the method may be illustrated with the working flow shown in FIG. 5, but the present invention is not limited thereto. According to some embodiments, one or more steps may be added, deleted, or changed in the working flow shown in FIG. 5.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for driving a touch and display driver integration (TDDI) integrated circuit (IC) of a touch-sensitive display panel, the apparatus comprising:
 a hybrid control circuit, coupled to the touch-sensitive display panel through the TDDI IC, arranged to control the TDDI IC to control the touch-sensitive display panel, the hybrid control circuit comprising:
  a reference voltage generator, arranged to generate a reference voltage having a predetermined voltage level to be a common voltage of the touch-sensitive display panel;
  a touch-sensing waveform generator, arranged to generate a touch-sensing waveform signal carrying at least one touch-sensing waveform;
  a multiplexer, coupled to the reference voltage generator and the touch-sensing waveform generator, arranged to select and output any of the common voltage and the touch-sensing waveform signal; and
  a common voltage operational amplifier (OPAMP), coupled to the multiplexer, arranged to drive said any of the common voltage and the touch-sensing waveform signal to the TDDI IC through a common voltage path, wherein:
   in a display phase of the touch-sensitive display panel, the common voltage OPAMP drives the common voltage to the TDDI IC through the common voltage path, for performing display control of the touch-sensitive display panel; and
   in a touch-sensing phase of the touch-sensitive display panel, the common voltage OPAMP drives the touch-sensing waveform signal to the TDDI IC through the common voltage path, for performing touch-sensing control of the touch-sensitive display panel.

2. The apparatus of claim 1, wherein the multiplexer selects and output said any of the common voltage and the touch-sensing waveform signal under control of a selection signal; and the hybrid control circuit further comprises:
 a control unit, arranged to control operations of the hybrid control circuit, wherein the control unit generates the selection signal, and two states of the selection signal correspond to the display phase and the touch-sensing phase, respectively.

3. The apparatus of claim 1, wherein the apparatus comprises a timing controller of the touch-sensitive display panel, and the hybrid control circuit is integrated into the timing controller.

4. The apparatus of claim 1, wherein the common voltage path comprises a wire positioned in a flexible printed circuit (FPC).

5. The apparatus of claim 1, wherein the common voltage path comprises a wire positioned in a flexible circuit of a chip-on-flex (COF) architecture.

6. The apparatus of claim 1, wherein the apparatus comprises a touch screen, wherein the touch screen comprises:
 the touch-sensitive display panel;
 the TDDI IC, mounted on the touch-sensitive display panel and coupled to the touch-sensitive display panel; and
 at least one portion of the common voltage path, coupled between the common voltage OPAMP and the TDDI IC.

* * * * *